United States Patent [19]

Atalla

[11] 4,328,414
[45] May 4, 1982

[54] MULTILEVEL SECURITY APPARATUS AND METHOD
[75] Inventor: Martin M. Atalla, Atherton, Calif.
[73] Assignee: Atalla Technovations, San Jose, Calif.
[21] Appl. No.: 102,858
[22] Filed: Dec. 11, 1979
[51] Int. Cl.³ .............................................. G06K 7/00
[52] U.S. Cl. .................................. 235/380; 235/379; 235/381
[58] Field of Search ...................... 235/379, 380, 381; 340/149 A, 152 A

[56] References Cited

U.S. PATENT DOCUMENTS

| | | | |
|---|---|---|---|
| 3,845,277 | 10/1974 | Voss et al. | 235/381 |
| 3,862,716 | 1/1975 | Black et al. | 235/381 |
| 3,938,091 | 2/1976 | Atalla et al. | 340/152 R |
| 4,016,405 | 4/1977 | McCune et al. | 235/380 |
| 4,198,619 | 4/1980 | Atalla | 235/381 |

Primary Examiner—Harold I. Pitts
Attorney, Agent, or Firm—A. C. Smith

[57] ABSTRACT

A card-encoding system and method preserves the security of the encoding process against duplication and counterfeiting of cards by securing the interactions under the control of the individual and then of the issuing institution. Multilevels of offset codes are generated in successive interactions so that attempted alteration, duplication, or counterfeiting of a coded card will be readily detectable using "off-line" card-checking apparatus.

3 Claims, 3 Drawing Figures

MULTILEVEL SECURITY APPARATUS AND METHOD

BACKGROUND OF THE INVENTION

Retailing businesses and banking institutions are currently suffering substantial financial losses due to unauthorized use of credit cards in the conduct of business at the consumer level. The problem of detecting counterfeit credit cards and unauthorized users of valid cards prior to completion of credit-card transactions has not been effectively solved to date. Banking institutions which are equipped with card-operated banking equipment are generally able to detect an attempted unauthorized use of a credit card because such banking equipment is conveniently connected to the institution's central processor and computer files for "on-line" operation of the equipment at each step in a credit-card transaction. However, the great majority of credit-card transactions by retailers around the world is usually completed in amounts under set credit limits without the convenience of "on-line" computer checking of each step in the transaction. Instead, simple "off-line" credit-card checking techniques are used which are based upon a comparison of the card number against a compiled listing of numbers of unauthorized cards and a visual check of a user's signature against a sample signature. Such lists of numbers of unauthorized cards are largely ineffective in reducing credit losses because of the delay in compiling and distributing the lists, and because such lists do not identify valid cards that have been reproduced or counterfeit cards that bear fictitious numbers.

Even inherently more secure transactions which are controlled by "on-line" interactive computer processing are subject to security violations resulting from insufficiently secured procedures used in issuing cards initially. Unscrupulous personnel within a card-issuing institution may compromise the security of an "on-line" card-operated, computer-controlled system, for example, by causing issuance of a card with an account or identification number that was previously assigned.

SUMMARY OF THE INVENTION

In accordance with the present invention, method and means are provided for securing card-oriented transactions at several levels of interaction between a card-issuing institution, its personnel, its customers and even its suppliers of blank cards. The present invention provides enhanced security against the duplication and proliferation of one valid card and against counterfeit cards with fictitious numbers by securing the interactive transaction between an individual and the institution upon establishment of the individual's new account, as well as securing the transaction involved at the institutional level in issuing the card to the individual. In addition, the present invention operates to secure the card against duplication in instances where each issued card has a unique identification. In this way, the individual may be assured that his interaction with the card-issuing institution is secured and that the institution's interactions with its personnel and its suppliers of cards are secured.

DESCRIPTION OF THE PREFERRED EMBODIMENT

Figure 1:
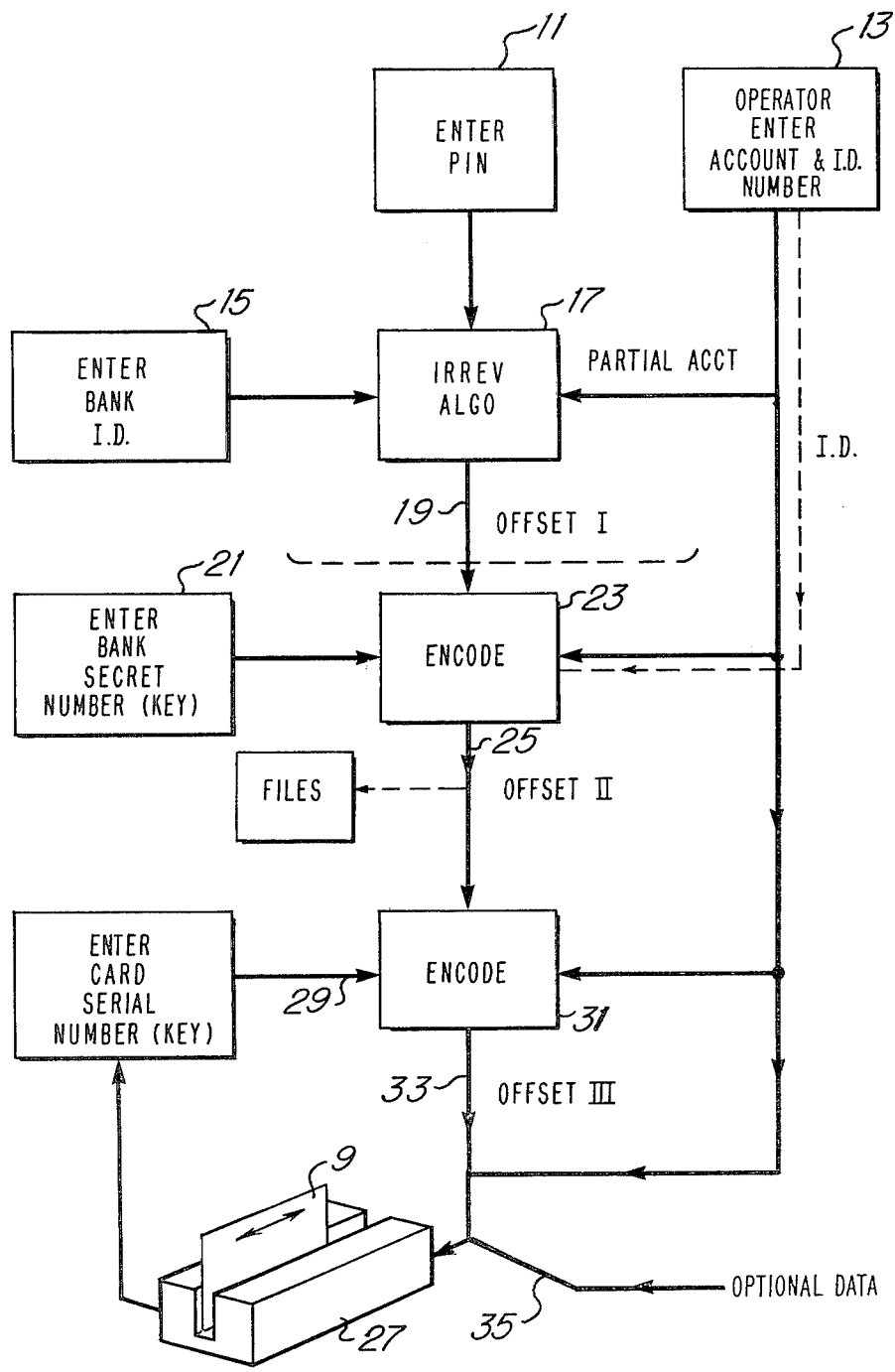
FIG. 1 is an illustration of the system involved in issuing a card and in using an issued card in an "off-line" card-checking transaction.

Referring now to FIG. 1, there is shown a pictorial and schematic diagram of the system of the present invention which operates on the personal identification number (PIN) of an individual (selected and known only by the individual), and on identification information furnished by an operator of the system to generate a credit card 9 which is unique to the individual and which is secured against unauthorized preparation or counterfeiting through multilevels of secured interactions.

In the initial sign-on transaction, an individual may select any code word or set of numbers, or combination thereof, which he may preserve in total secrecy and which he enters 11 initially into the system via any conventional means such as a keyboard, telephone dial apparatus, or the like. In addition, an operator of the system enters an assigned account number 13 (and also identifies himself using his own identification word or number). Optionally, the identification number of the institution (e.g., route and transit number of a bank, etc.) may also be furnished 15. Thus, the individual's secret identifying code (PIN) 11 plus all or an initial part of the new account number 13, plus any desired identification information pertaining to the institution, is supplied to an encoding device 17 for irreversible encryption of the data to generate a first compiled code word, or OFFSET I at the output 19 of the encoding device 17. The encoding device 17 may include a conventional National Bureau of Standards (NBS) data-encryption integrated circuit (commercially available from Motorola, Inc.) having multiple inputs for encoding the signals applied thereto, and may be operated according to a known irreversible algorithm (for example, as disclosed in U.S. Pat. No. 3,938,091 and in U.S. Patent Application Ser. No. 879,784, now issued as U.S. Pat. No. 4,198,619) to yield an OFFSET I of fixed length for any length of applied code words. This initial encryption may be performed on an isolated encrypting device to produce OFFSET I for transmission by conventional means to the next encoding means 23. Thus, the first level of interaction between the institution and the individual which produces the OFFSET I is secured by the individual who retains the secrecy of his own PIN.

At the next level of interaction, the institution is able to secure the transaction against unauthorized operation of the system by unscrupulous personnel. The institution may perform a number of checks and inquiries, as later described, relative to the authority of the system operator, the status of the assigned account number, etc., prior to encoding in the encoding means 23 the new account number, the OFFSET I and a secret identification key 21 that is unique to the institution. Upon successful completion of checks and inquiries by the institution, the encoding means 23 (for example, including an aforementioned NBS circuit) may encrypt the applied data according to an algorithm of the type described in the aforementioned U.S. Pat. No. 3,938,091 or U.S. Patent Application Ser. No. 879,784, now issued as U.S. Pat. No. 4,198,619, or the like, to yield a new compiled code word or OFFSET II at the output 25 of the encoding means 23. This OFFSET II may be stored in files, for example, computer memory, printed lists, or the like, for later use with respect to transactions involving the individual and his card 9. Thus, the second level of interaction which produces OFFSET II required to produce a secured card 9 is under the security and control of the institution which may perform numerous checks and inquiries, later described herein, and which also retains the secrecy of its own secret key 21.

In many applications, the OFFSET II may be used directly to prepare a card 9 by encoding the card 9 magnetically, optically, mechanically, etc., in known manner with the account number and OFFSET II. Subsequent use of the card 9 thus produced in connection with a secured transaction would require entry of the individual's PIN 11 at the time of a transaction, the account number 13 (omitting an operator's I.D.), the bank I.D. 15 and the bank secret key 21, all in the manner previously described to produce an OFFSET II according to the same algorithms and encryption schemes used in the initial sign-on transaction, which OFFSET II could then be compared in known manner with the OFFSET II detected from the card 9 as the basis for determining whether the authorized individual who is unique to the card 9 is attempting to complete a secured transaction.

However, in certain applications requiring an additional level of secured interaction, the present invention may be used to ensure that no valid card can be duplicated. Thus, the supplier or actual issuer of cards (i.e., where different from the entity that generates OFFSETS I and II), may introduce an additional level of secrecy in producing the card 9. Each card 9 may be produced with a unique code or serial number which is different for each card. This unique code or serial number may be permanently implanted in each card mechanically, optically, magnetically, or the like, for subsequent detection by card transducer 27. The card serial number 29 thus detected is applied to encoding means 31 which may also contain an NBS circuit of the type previously described, for encrypting with OFFSET II and the account number in a known manner (for example, in accordance with the encryption algorithm disclosed in the aforecited U.S. Pat. No. 3,938,091 or U.S. Patent Application Ser. No. 879,784, now issued as U.S. Pat. No. 4,198,619) to produce a compiled code word, or OFFSET III at the output 33. A fully encoded card 9 may now be produced by card transducer 27 which can produce a record thereon mechanically, optically, magnetically, or the like, in known manner (but without altering the card serial number) from OFFSET III, the account number, and optional data 35 such as expiration date, access restrictions, credit limits, etc. The OFFSET III which may be of fixed length and which is unique for one card, one individual and one bank, may be recorded on the card 9 in location preceding the account number for subsequent detection and comparison during completion of a secured transaction. Movement of a card 9 through card transducer 27 suffices to detect the serial number 29 of the card, and movement again (say, in the opposite direction) suffices to make the aforementioned recordings on the card 9 that are unique to the individual and institution.

During the completion of a subsequent secured transaction using the card 9, the authorized individual may enter his PIN 11 and his own assigned account number, and submit his card 9 for detection of its serial number and the recorded OFFSET III thereon. Substantially the same encryption of applied codes (except for the identifying code of a system operator during initial sign-on) may be completed to produce an OFFSET III for comparison with the OFFSET III detected from the card 9. Upon detection of parity of the newly-generated OFFSET III with the OFFSET III read out from the card 9, the transaction may be completed with respect to the individual whose PIN 11 was entered. Other subsequent code comparisons involving a recorded card 9 may also be performed using less than such full "on-line" checking capability, for example, under circumstances where the serial number of the card is implanted therein by secret means (as in certain European banking systems). Under such circumstances, the OFFSET II may be recorded on the card 9 for encoding "off-line" only with similar means as encoding means 31 upon the individual's entered account number and the OFFSET II and card serial number detected from the card. The OFFSET III thus produced must compare favorably with the OFFSET III read out from the card 9 to signal an authorized transaction.

Figure 2:
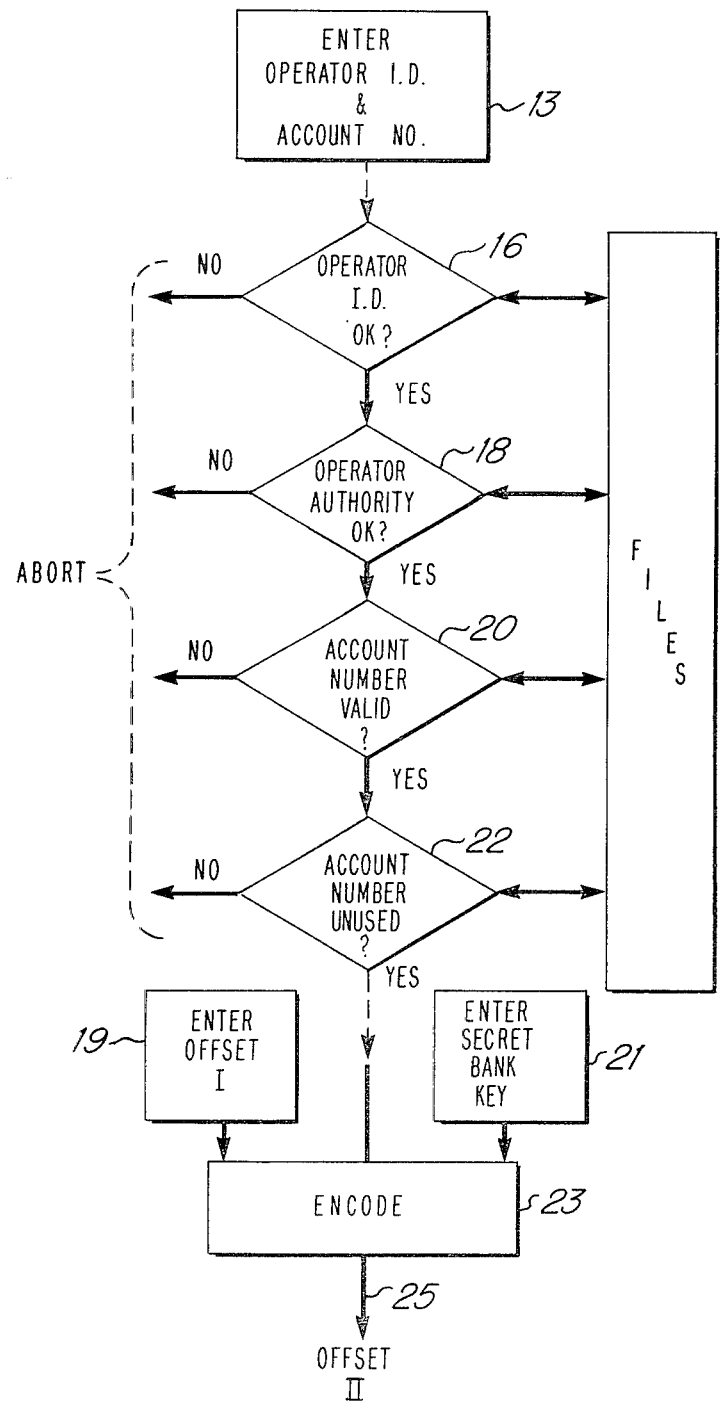
FIG. 2 is a flow chart illustrating the information supplied to and produced by the apparatus of the present invention.

Referring now to FIG. 2, there is shown a flow chart of the present invention which illustrates the logic expansion thereof for the protection of the institution at the aforementioned second level of interaction. Note that several checks and inquiries may be completed relative to the institution's operating personnel prior to generating the OFFSET II. For example, the institution may check the identification number 16 of the system operator against its file information to ensure that only its authorized personnel can operate the system. Upon successful completion of the first check, the operator's authority to assign an account number 18 may be checked against file information. Upon successful completion of this check, then account information may be checked 20 to determine, for example, that the assigned account number is one which the institution previously set up to be assigned. Also, the institution may check file information to ensure that a previously-assigned valid account number is not reassigned to another individual as well. Numerous other checks and inquiries may be made by the institution consistent with the security objectives it endeavors to meet and prior to encrypting in encoding means 23 the OFFSET I 19, the secret key 21 and account number, as previously described, to generate the OFFSET II.

Figure 3:
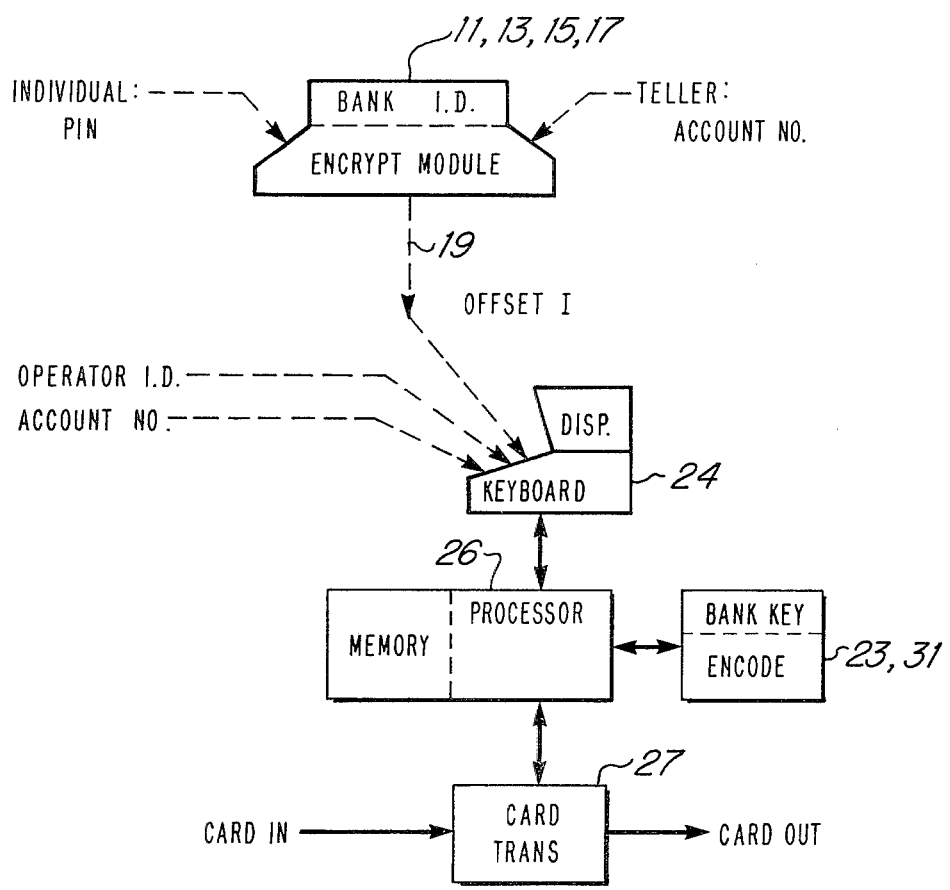
FIG. 3 is a block diagram of the apparatus of the present invention for issuing cards to specific individuals in a manner that preserves a high degree of security at all levels of interaction.

Referring now to FIG. 3, there is shown a block diagram of the apparatus for operation according to FIGS. 1 and 2. The initial level of interaction with an individual newly signing on may be performed by an encrypting module 11, 13, 15, 17 having one keyboard upon which the individual may enter his PIN secretly and another keyboard upon which an operator or teller may enter an account number. The module may also have a bank identification number (e.g., route and transit number) included therein for encoding with the keyboard-supplied information. Such modules and their operation are described in the literature (see, for example, U.S. Pat. No. 3,938,091 and U.S. Patent Application Ser. No. 879,784, now issued as U.S. Pat. No. 4,198,619). Using an irreversible encryption algorithm of the type described, the module produces an OFFSET I of fixed word length independently of the length of the applied PIN and account number and bank identification number, and therefore preserves the security of the PIN for the assigned account number. The OFFSET I can be conveniently transmitted without security to the next station where an operator authorized to issue cards may complete the initial sign-on of an individual. Using a keyboard with display 24 coupled to a processor with memory files 26 in conventional configuration, an operator may enter his identification number and the OFFSET I and the account number for controlling the processor 26 to perform the initial check and inquiry and the subsequent encryption in encoding module 23, as described in connection with FIG. 2. The secrecy of the bank key 21 may be preserved by retaining it in volatile manner within the encoding module 23, 31. Thereafter, the processor 26 may control the card transducer 27 to detect the secretly and permanently recorded serial number on a card and to control the encoding module 23, 31 (may be the same module time shared) to produce and record the OFFSET III from the OFFSET II and the card detected serial number. In this way, the institution may complete the assignment of a recorded card 9 to an individual using the apparatus at diverse locations without compromising the security against card duplication and counterfeiting which the present system provides to the individual, the institution and even the card-issuing entity.

I claim:

1. Method of encoding each of a plurality of cards assigned to individuals by an entity, where each card includes a unique card code, the method comprising the steps of:

combining in accordance with a first logical encoding combination a secret code received from an individual and an identifying code assigned to the individual to produce an initial offset code;

combining in accordance with a second logical encoding combination a secret code received from the entity and a code indicative of the initial offset code to produce an auxiliary offset code;

detecting the card code of the one card assigned to the individual;

combining in accordance with a third logical encoding combination the auxiliary offset code and the card code to produce an output offset code; and encoding the card with a detectable code that is representative of at least the output offset code.

2. Apparatus for encoding each of a plurality of cards assigned to individuals by an entity, where each card includes a unique card code, the apparatus comprising:

first and second encoding means each for producing an offset code signal as a logical combination of code signals applied thereto;

means coupled to the first encoding means for applying thereto a secret code signal known only to the individual and an identifying code signal assigned to the individual for producing an initial offset code signal as a first logical combination of the applied code signals;

means coupled to the second encoding means for applying thereto the initial offset code signal and a secret code signal known only to the entity for producing an auxiliary offset code signal as a second logical combination of the applied code signals;

first transducer means interactively operable with a card for responding to a card code thereon to produce a representative card code signal;

circuit means including a third encoding means coupled to receive the card code signal and the auxiliary offset code for producing a card coding signal as a logical combination of the received card code signal and auxiliary offset code signal;

second transducer means connected to receive said card coding signal and interactively operable with a card for recording a detectable code thereon which is representative of at least said card coding signal.

3. The method according to claim 1 which is operable to verify the authority of an individual to complete a transaction in association with the unique card which is assigned to the individual, the method comprising the additional steps of:

reproducing an initial offset code at the time of the transaction by combining in accordance with said first logical encoding combination a secret code received from the individual and an identifying code assigned to the individual;

reproducing an auxiliary offset code at the time of the transaction by combining in accordance with said second logical encoding combination a secret code received from the entity and the code indicative of the initial offset code produced at the time of the transaction;

detecting the unique card code from the card at the time of the transaction;

reproducing a detectable code at the time of the transaction by combining in accordance with said third logical encoding combination the auxiliary offset code produced at the time of the transaction and the card code; and comparing the detectable code thus produced with the detectable code detected from said card for parity as a condition for completing the transaction.

* * * * *